United States Patent [19] [11] 4,153,902

Kanayama [45] May 8, 1979

[54] BUBBLE REMOVAL IN AN INK LIQUID SUPPLY FOR AN INK JET SYSTEM PRINTER

[75] Inventor: Yoshio Kanayama, Nabari, Japan

[73] Assignee: Sharp Kabushiki Kaisha, Osaka, Japan

[21] Appl. No.: 851,951

[22] Filed: Nov. 16, 1977

[30] Foreign Application Priority Data

| | | | |
|---|---|---|---|
| Nov. 19, 1976 | [JP] | Japan | 51-156105 |
| Mar. 26, 1977 | [JP] | Japan | 52-33505 |

[51] Int. Cl.2 .......... G01D 15/18
[52] U.S. Cl. .......... 346/140 R; 346/75
[58] Field of Search .......... 346/75, 140 R

[56] References Cited

U.S. PATENT DOCUMENTS

| | | | |
|---|---|---|---|
| 3,929,071 | 12/1975 | Cialone et al. | 346/140 R X |
| 4,079,384 | 3/1978 | Takano et al. | 346/140 R |

*Primary Examiner*—George H. Miller, Jr.
*Attorney, Agent, or Firm*—Brich, Stewart, Kolasch & Birch

[57] ABSTRACT

The present invention is directed to an ink liquid supply system wherein a subtank is interposed between an ink liquid reservoir and a pump in the ink liquid supply system for an ink jet system printer. Waste ink liquid not contributing to the printing operation is collected by a beam gutter and returned to the subtank. A first coarse filter and a second fine filter are disposed within the subtank in order to remove dust and bubbles included within the ink liquid introduced into the subtank.

11 Claims, 3 Drawing Figures

BUBBLE REMOVAL IN AN INK LIQUID SUPPLY FOR AN INK JET SYSTEM PRINTER

BACKGROUND OF THE INVENTION

The present invention relates to an ink liquid supply system for an ink jet system printer and, more particularly, to an ink liquid supply system which can remove bubbles included within the ink liquid to be supplied to a nozzle.

In order to obtain a clean printing in an ink jet system printer, especially in an ink jet system printer of the charge amplitude controlling type, it is necessary that uniform ink droplets are emitted from a nozzle at a given rhythm. When bubbles are contained in ink liquid supplied to a nozzle, the drop formation rhythm adversely is influenced and, therefore, print distortion will be created.

A typical ink liquid supply system is disclosed in U.S. Pat. No. 4,007,684 "ENTITLED INK LIQUID WARMER FOR INK JET SYSTEM PRINTER", issued on Feb. 15, 1977. In an ink jet system printer of the charge amplitude controlling type, ink droplets not contributing to printing operation are collected by a beam gutter and recirculated. Therefore, it is inevitable that bubbles are included in the ink liquid to be supplied to the nozzle.

In the conventional ink jet system printer of the charge amplitude controlling type, an air trap is interposed within the ink liquid supply system to remove large bubbles contained in the ink liquid. However, small bubbles are not removed in the conventional ink liquid supply system. Moreover, filter means are provided in the conventional ink liquid supply system to remove dust contained in the ink liquid but not to remove bubbles contained in the ink liquid to be supplied to the nozzle.

OBJECTS AND SUMMARY OF THE INVENTION

Accordingly, an object of the present invention is to provide an ink liquid supply system for an ink jet system printer, which ensures stable printing.

Another object of the present invention is to remove bubbles contained in ink liquid supplied through an ink liquid supply system for an ink jet system printer.

Still another object of the present invention is to stabilize drop formation in an ink jet system printer of the charge amplitude controlling type.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a subtank is interposed between an ink liquid reservoir and a pump in an ink liquid supply system for an ink jet system printer. Waste ink liquid collected by a beam gutter is returned to the subtank. A first coarse filter and a second fine filter are disposed within the subtank in order to remove dust and bubbles contained in the ink liquid introduced into the subtank.

In a preferred form, the first and second filters are cylindrically shaped. The ink liquid is introduced from the ink liquid reservoir and the beam gutter into the subtank at the outer side of the first cylindrically shaped coarse filter. The ink liquid is derived from the subtank at the internal side of the second cylindrically shaped fine filter.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
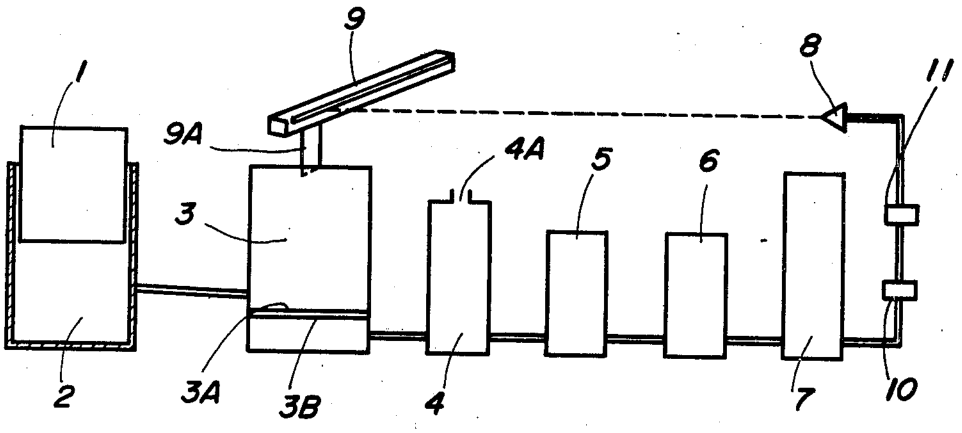
FIG. 1 is a schematic block diagram of an ink liquid supply system including an embodiment of a subtank of the present invention.

FIG. 1 shows an ink liquid supply system for an ink jet system printer of the charge amplitude controlling type, in combination with an embodiment of a subtank of the present invention.

An ink cartridge 1 is disposed above an ink liquid reservoir 2 to maintain an ink liquid level in the ink liquid reservoir 2 at a predetermined value. A subtank 3 is connected to receive ink liquid supply from the ink liquid reservoir 2. An air trap 4 is connected to receive the ink liquid supply from the subtank 3 for removing bubbles included within the ink liquid supplied from the subtank 3. The air trap 4 includes an air discharge opening 4A.

The ink liquid is supplied to a nozzle 8 under a predetermined pressure through a pump 5, an air chamber 6, an electromagnetic valve 7, a line filter 10 and a mask filter 11. The air chamber 6 functions to remove the pressure pulsation caused by the pump 5. The electromagnetic valve 7 functions to control the ink liquid supply to the nozzle 8, that is, control the opening and closing of the ink liquid passage. The line filter 10 functions to remove dust or impurities included within the ink liquid, and the mask filter 11 functions to protect the nozzle 8 from the impurities included within the ink liquid.

When the electromagnetic valve 7 is opened, ink droplets are emitted from the nozzle 8 for recording purposes. Ink droplets not contributive to writing operation are directed toward a beam gutter 9 in order to recirculate the waste ink liquid to the subtank 3 through a conduit 9A. When the electromagnetic valve 7 is closed, the ink issuance or discharge from the nozzle 8 is terminated.

The subtank 3 includes a first coarse filter 3A and a second fine filter 3B. The filtration accuracy of the first coarse filter 3A is about 150 $\mu$m, and the filtration accuracy of the second fine filter 3B is about several tens microns. The ink liquid from the ink liquid reservoir 2 and the waste ink liquid recirculated from the beam gutter 9 is supplied to the air trap 4 through the first coarse filter 3A and the second fine filter 3B.

The filter means disposed in the subtank 3 function to remove air contained in the ink liquid at the starting point of the ink liquid supply through the use of the temperature variations of the ink liquid. More specifically, when the ink liquid introduced into the subtank 3 initially contacts the first coarse filter 3A, bubbles are created because of the temperature variation of the ink liquid. Bubbles having a size greater than 150 μm travel upward, and bubbles having a size smaller than 150 μm travel through the first coarse filter 3A in unison with the ink liquid. In addition, the first coarse filter 3A functions to remove dust included within the ink liquid.

The ink liquid passed through the first coarse filter 3A contacts the second fine filter 3B. Since the second fine filter 3B is finer than the first coarse filter 3A, the contact area is large and, therefore, more bubbles are created at the second fine filter 3B. The thus formed bubbles travel upward, namely, the bubbles are removed. However, small bubbles travel through the second fine filter 3B and, then, the small bubbles are removed at the air trap 4.

The subtank 3 of the present invention has two filters and, therefore, the removal of the bubbles is effectively performed. When only one coarse filter is provided, the bubble removal is not sufficiently performed. Contrarily when only one fine filter is provided, the operational life of the filter is extremely short due to the dust included within the ink liquid.

Figure 2:
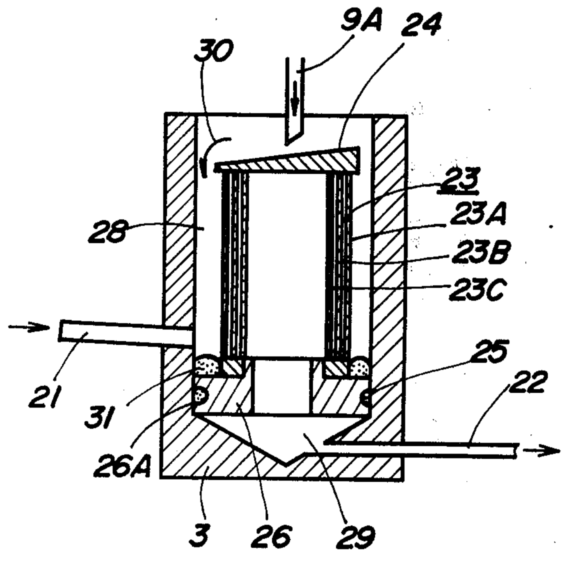
FIG. 2 is a sectional view of another embodiment of the subtank of the present invention.
Figure 3:
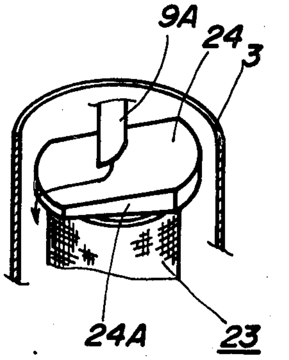
FIG. 3 is a perspective view of an upper portion of the subtank of FIG. 2.

FIGS. 2 and 3 show another embodiment of the subtank 3 of the present invention, which includes cylindrically shaped filter means 23. A filter ring 26 is disposed at the lower section of the subtank 3 and supported by the wall of the subtank 3 via an O-shaped ring 25. The O-shaped ring 25 is installed within a groove 26A formed on the periphery of the filter ring 26, whereby the filter ring 26 is tightly supported by the wall of the subtank 3.

The filter means 23 is fixed to the filter ring 26. A guide plate 24 is disposed on the filter means 23. The upper surface of the guide plate 24 is inclined in a predetermined direction so as to conduct the waste ink liquid recovered from the conduit 9A toward the periphery of the filter means 23 as shown by an arrow 30. The guide plate 24 has a cut away portion 24A as shown in FIG. 3 so that the interior of the filter means 23 is communicated to the ambient air.

The filter means 23 comprise a first coarse filter 23A having a filtration accuracy of about 150 μm, a second fine filter 23B having a filtration accuracy of several tens microns, and a third coarse filter 23C having a filtration accuracy of about 150 μm. These filters 23A, 23B and 23C are cylindrically shaped.

The ink liquid is introduced from the ink liquid reservoir 2 through a conduit 21 into a cavity 28, and the recovered ink liquid introduced from the conduit 9A is also directed to the cavity 28 via the guide plate 24. The thus introduced ink liquid is passed, second and the first through third filters 23A, 23B and 23C and supplied to the air trap 4 via a cavity 29 and a conduit 22. The dust included within the ink liquid is removed by the first filter 23A and retained at the bottom 31 of the cavity 28.

The bubble formation and removal are similar to those achieved by the filters 3A and 3B of FIG. 1. The bubbles not removed by the filter means 23 are removed at the cavity 29 and the air trap 4. The bubbles removed at the cavity 29 are discharged to the ambient air through the cut away portion 24A of the guide plate 24.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In an ink liquid supply system for an ink jet system printer which emits ink droplets from a nozzle for performing a writing operation, said ink liquid supply system being provided with an ink liquid reservoir for containing ink liquid therein, conduit means for connecting said ink liquid reservoir with said nozzle and supply means for supplying the ink liquid through said conduit means to said nozzle, the improvement comprising:

- a subtank disposed between said ink liquid reservoir and said supply means;
- a first coarse filter disposed in said subtank; and
- a second fine filter disposed in said subtank.

2. The ink liquid supply system of claim 1, wherein ink droplets emitted from said nozzle but not contributive to the writing operation are collected by a beam gutter and introduced into said subtank.

3. The ink liquid supply system of claim 2, wherein said first and second filters are cylindrically shaped, and said first filter is disposed so as to surround said second filter.

4. The ink liquid supply system of claim 3, wherein the ink liquid is introduced into said subtank at an external surface of said first cylindrically shaped course filter, and the ink liquid is discharged from said subtank at the interior of said second cylindrically shaped fine filter.

5. The ink liquid supply system of claim 3, wherein said subtank comprises:

- an inlet formed in the side wall of the subtank for introducing the ink liquid from said ink liquid reservoir;
- an opening formed in the upper section of the subtank for introducing the ink liquid from said beam gutter; and
- an outlet communicating to the bottom section of the interior of said second cylinder shaped fine filter for discharging the ink liquid to said supply means.

6. The ink liquid supply system of claim 5, wherein said subtank further comprises a guide plate disposed above said first and second cylindrically shaped filters for directing the ink liquid introduced from said beam gutter toward the exterior of said first cylindrically shaped coarse filter.

7. In an ink liquid supply system for an ink jet system printer which emits ink droplets from a nozzle for performing a writing operation, said ink liquid supply system being provided with an ink liquid supply system being provided with an ink liquid reservoir for containing ink liquid therein, conduit means for connecting said ink liquid reservoir with said nozzle and supply means for supplying the ink liquid-through said conduit means to said nozzle, the improvement comprising:

- a subtank disposed between said ink liquid reservoir and said supply means;
- a first means disposed in said subtank for removing dust contained in the ink liquid introduced into said subtank; and
- a second means disposed in said subtank for removing bubbles contained in the ink liquid introduced into said subtank, and wherein the ink liquid is forced to travel through said first means and then said second means.

8. The ink liquid supply system of claim 7, wherein said first means is a filter having a filtration accuracy of about 150 μm, and said second means is another filter having a filtration accuracy of several tens microns.

9. An ink liquid supply system for an ink jet system printer which emits ink droplets from a nozzle for performing writing operation, said ink liquid supply system comprising:

an ink liquid reservoir for containing ink liquid therein;

conduit means for connecting said ink liquid reservoir with said nozzle;

a pump for supplying the ink liquid from said ink liquid reservoir to said nozzle through said conduit means under a predetermined pressure; and a subtank disposed between said ink liquid reservoir and said pump, said subtank including:

a first coarse filter disposed therein; and a second fine filter disposed therein.

10. The ink liquid supply system of claim 9, wherein ink droplets emitted from said nozzle but not contributive to the writing operation are collected by a beam gutter and introduced into said subtank.

11. The ink liquid supply system of claim 9, which further comprises an air trap disposed between said subtank and said pump for removing bubbles included within the ink liquid.

* * * * *